United States Patent
Deans et al.

(10) Patent No.: US 7,747,013 B2
(45) Date of Patent: Jun. 29, 2010

(54) EARLY DETECTION SYSTEM AND METHOD FOR ENCRYPTED SIGNALS WITHIN PACKET NETWORKS

(75) Inventors: Dennis Deans, Kanata (CA); Lee Dilkie, Stittsville (CA); Sonya G Fullarton, Ottawa (CA); Radovan Prodanovic, Kanata (CA); Dieter Schulz, Dunrobin (CA); Dave Speirs, Ottawa (CA); Jean-Yves Patry, Gatineau (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1399 days.

(21) Appl. No.: 11/063,563

(22) Filed: Feb. 24, 2005

(65) Prior Publication Data

US 2006/0233362 A1 Oct. 19, 2006

(51) Int. Cl.
  *H04L 9/00* (2006.01)
  *H04L 12/28* (2006.01)
(52) U.S. Cl. .............. 380/42; 380/255; 370/395.2; 704/273
(58) Field of Classification Search .......... 380/42, 380/255, 275; 713/155, 164, 152; 370/395.2, 370/395.21; 704/273
See application file for complete search history.

(56) References Cited

U.S. PATENT DOCUMENTS

| | | | | |
|---|---|---|---|---|
| 4,528,659 A | * | 7/1985 | Jones, Jr. | 370/435 |
| 5,185,796 A | * | 2/1993 | Wilson | 380/277 |
| 5,933,475 A | * | 8/1999 | Coleman | 379/10.01 |
| 6,757,823 B1 | * | 6/2004 | Rao et al. | 713/153 |
| 6,865,681 B2 | * | 3/2005 | Nuutinen | 726/14 |
| 7,206,932 B1 | * | 4/2007 | Kirchhoff | 713/152 |
| 2002/0039419 A1 | * | 4/2002 | Akimoto et al. | 380/243 |
| 2002/0129236 A1 | * | 9/2002 | Nuutinen | 713/151 |
| 2002/0154760 A1 | * | 10/2002 | Branden | 379/386 |
| 2003/0072272 A1 | * | 4/2003 | Koide et al. | 370/298 |
| 2003/0128696 A1 | * | 7/2003 | Wengrovitz et al. | 370/352 |
| 2006/0233362 A1 | * | 10/2006 | Deans et al. | 380/42 |

FOREIGN PATENT DOCUMENTS

EP 1223706 A2 7/2002

* cited by examiner

*Primary Examiner*—Eleni A Shiferaw

(57) ABSTRACT

A system and method for providing early detection of encrypted signals within a secure connection for voice over Internet protocol (VoIP). The system and method includes a non-complex, in-band, and early encryption detector within the voice path. A transmitter sends out a known pattern. Based upon the received pattern, the receiver decides whether its encryption capabilities match up with those of the transmitter. If the capabilities do not match, then the receiver waits for the signalling message for the correct mode of operation. No packets are utilized until the receiver and transmitter encryption capabilities are matched.

3 Claims, 5 Drawing Sheets

EARLY DETECTION SYSTEM AND METHOD FOR ENCRYPTED SIGNALS WITHIN PACKET NETWORKS

FIELD OF THE INVENTION

The present invention relates generally to providing enhanced security for Internet telephony calls. More particularly, the present invention provides a system and method of early detection of encrypted signals within a secure connection for Voice Over IP (VoIP).

BACKGROUND OF THE INVENTION

Advances within Internet technologies have spawned new mechanisms of data, voice, and video communication including Internet Protocol (IP) telephony, which is a quickly developing field of telecommunications. However, the Internet is faced with two significant obstacles to fast, yet secure, communications. The first obstacle is usable bandwidth. Bandwidth affects the rate at which data can be transferred. The second obstacle pertains to security. The Internet is not a direct point-to-point connection between computers. Rather, it is a network to which computers (or other devices) can connect for the purpose of communicating with one another. As such, there is increased opportunity for eavesdropping on data, voice, or video transmissions over the Internet. One method of enhancing the security of Internet based communications is to encrypt the data being transmitted before sending it out over the network and de-encrypting the data once it is received by the far end device. Voice security is desirable for VoIP connections over an IP network.

The present invention addresses security issues with respect to VoIP telephone calls. Currently, a call signalling channel is secured by using either a Transport Layer Security (TLS), a Secure Sockets Layer (SSL), or an IP Security Protocol (IPSec) on a secure well-known port. These approaches, however, suffer from delays in call setup time, complex handshaking procedures, and significant protocol overhead. Moreover, some VoIP implementations do not prevent signalling information from being viewed by unscrupulous computer hackers on the IP network used for VoIP calls. In some instances, when a SETUP message is sent over the IP network, the calling name and calling number is visible to sniffers or other such tools used on the Internet. To overcome this, voice packets are encrypted at a source and decrypted at the destination in order that a third party cannot eavesdrop on the conversation.

In order to properly advise both endpoints as to how to encrypt the voice packet, media signalling must carry the appropriate security information for negotiation requirements. This signalling must also be passed over a secure channel in order that third parties are not aware of what encryption procedures are being negotiated. Unfortunately, the delay of the signalling path relative to established voice path can result in some undesirable side effects. In FIG. 1, a typical VoIP system including an Internet Protocol Network 100 is shown with a signalling path 15 shown relative to an established voice path 14 between two IP telephony devices 10, 13. A switch 11 is represented in the signalling path 15. Clearly, the shorter path exists in-band. The main concerns in such a VoIP system include noise and voice clipping. Noise occurs when the receiver expects to decipher a real time transport protocol (RTP) packet based on a "best guess", but receives the packets based on a different cipher, or no cipher before the signalling is sent to the receiver. Voice clipping occurs because the receiver may not play any RTP packets until final negotiation, in which case initial packets would be missed. Typically, the receiver must wait for the final confirmation of the negotiated capabilities of the endpoints before accepting the voice stream packets. On the other hand, if the receiver does not wait for the confirmation, loud "noise" may be played out when the capabilities of the transmitter and receiver do not match.

What is needed is a method that increases security, simplifies VoIP handshaking procedures, and reduces call setup time without adding significant protocol overhead. Further, what is needed is a method that addresses both noise and voice clipping concerns.

SUMMARY OF THE INVENTION

The object of the invention is to remedy the drawbacks set out above by proposing a method that inserts an early encryption detector into the voice path.

The present invention includes a system and method whereby the receiver does not have to wait for the final confirmation of the negotiated capabilities of the endpoints before accepting the voice stream packets. This avoids clipped voice (discarded packets) at call setup caused by the signalling path over a VoIP network having a much larger delay than the voice path. The present invention avoids loud "noise" being played out when the capabilities of the transmitter and receiver do not match.

The present inventive system and method includes a non-complex, in-band, early encryption detector within the voice path (RTP stream). The transmitter sends out a known pattern (for example zeros). Based upon the received pattern, the receiver decides whether its encryption capabilities match up with those of the transmitter. If the capabilities do not match, then the receiver waits for the signalling message for the correct mode of operation. No packets are utilized until the receiver and transmitter encryption capabilities are matched.

DETAILED DESCRIPTION

Figure 1:
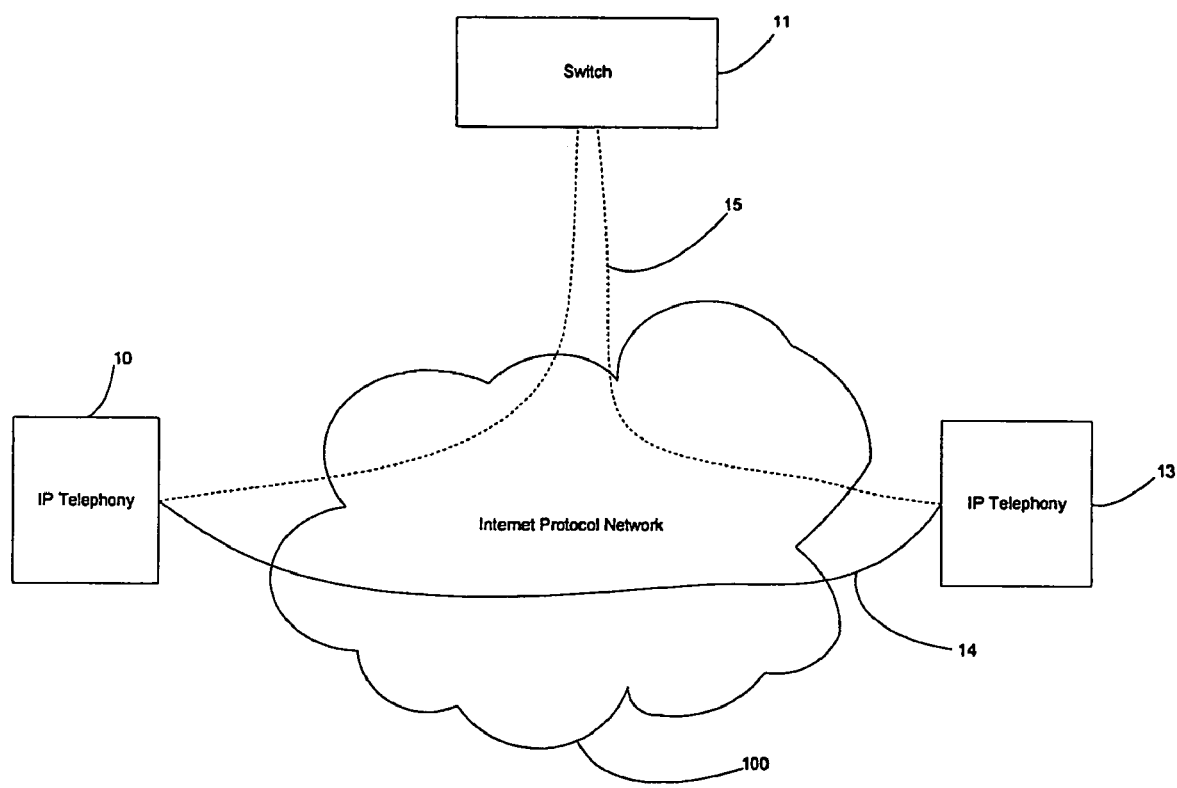
FIG. 1 shows a typical VoIP system with a signalling path and an established voice path between two IP telephony devices.
Figure 2:
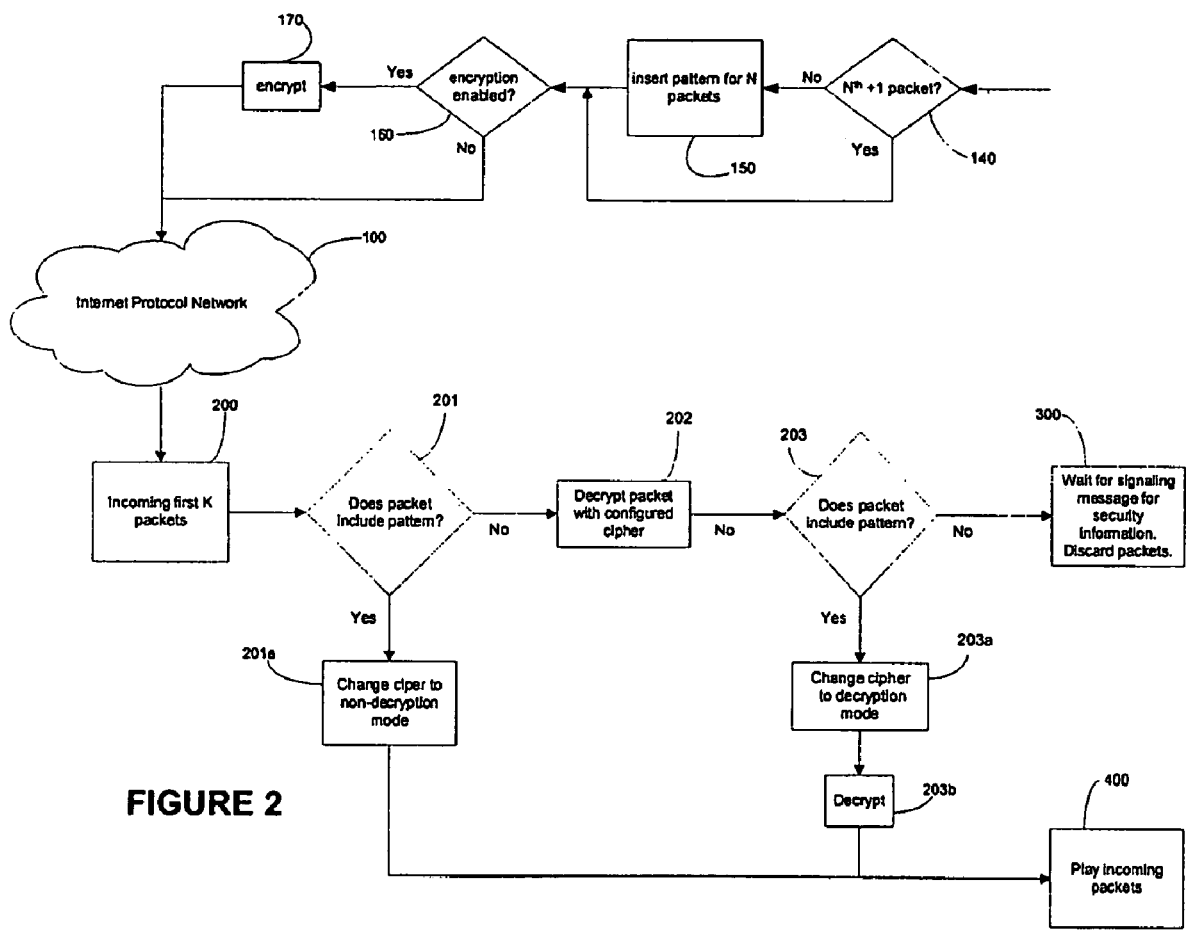
FIG. 2 is a flow diagram in accordance with the preferred embodiment of the present invention.

The method of the present invention includes early encryption detection during call setup for a call utilizing voice encryption. Such early detection is shown by way of the flowchart in FIG. 2. It should be understood that, at the start of the call, the first N (where N is an integer) packets are modified at the transmitter with a specific pattern. This is shown at step 150 in FIG. 2. After the Nth packet (step 140), the pattern insertion step 150 would be bypassed. If the packet were encryption enabled (step 160), then the packet would be encrypted at step 170. The inserted pattern is used at the receiver end to indicate matching capabilities and is discussed in further detail below. FIG. 2 also shows the methodology used at the receiver end if the first delivered packet(s) arrive(s) before the signalling message.

Incoming packets from the Internet Protocol Network 100 are received. The method checks for a specific pattern in the first K (where K is an integer) received packets at step 200. The method then determines whether or not the specific pattern is detected within the unencrypted packet at step 201. If the specific pattern is found within the unencrypted packet, then the transmitter is determined to have sent the voice as unencrypted. The cipher is changed to non-decryption mode in step 201a. Thereafter, all following packets are treated as non-encrypted and played out at step 400.

If the method determines in step 201 that the specific pattern is not detected, the receiver decrypts the packet at step 202 and searches for the pattern again at step 203. If the specific pattern is detected at step 203, then the cipher algorithms at the transmitter and receiver are matches and the cipher is changed to decryption mode at step 203a. The subsequent packets are then decrypted at step 203b and played out at step 400. If the specific pattern cannot be detected at step 203 (either on the unencrypted or decrypted packet), the receiver cannot make a decision on the mode of encryption of the transmitter. Consequently, all such packets are discarded at step 300 until the appropriate signalling message is received in the form of the specific pattern detection that serves to confirm the mode of operation of the transmitter.

In accordance with the preferred embodiment of the present invention, the specific pattern detected is a string of silence. This pattern of silence depends on the voice CODEC type. For example, such pattern of silence is 0xff in G.711 (mu-law); in G.711 (a-law), such pattern of silence is 0xd5; and, for G.729 such pattern of silence is 0x00. Other CODECs may have different silence patterns. It should be understood to one skilled in the art of audio compression protocols that the G.7xx CODECs (e.g., G.711, G.721, G.722, G.726, G.727, G.728, G.729) is a suite standards developed under the International Telecommunication Union's Telecommunication Standardization Sector (ITU-T) for audio compression and de-compression. These standards are primarily used in telephony. In such telephony, there are two main algorithms defined in the standard, "mu-law" algorithm (used in America) and "a-law" algorithm (used in Europe and the rest of the world).

Figure 3:
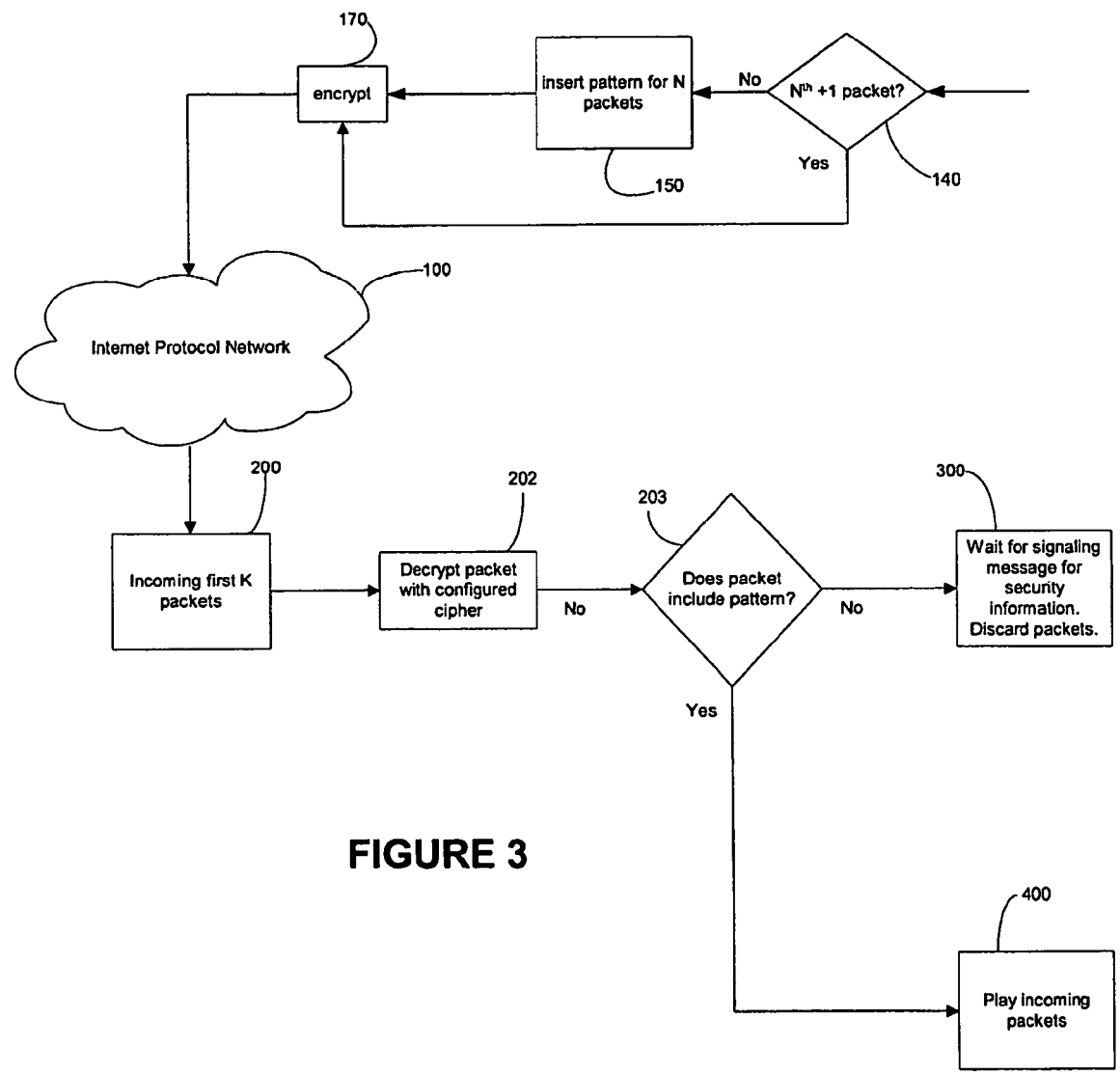
FIG. 3 is a flow diagram in accordance with an alternative embodiment of the present invention.

In FIG. 3, an alternative embodiment is shown according to the present invention. In such alternative embodiment, encryption is always present. As with regard to FIG. 2, the first N packets are modified (step 150) with a specific pattern at the start of the call at the transmitter end. The packet is then encrypted at step 170. After the $N^{th}$ packet (step 140), the pattern insertion step 150 would be bypassed. The inserted pattern is used at the receiver end to indicate matching capabilities and is discussed in further detail below.

Incoming packets from the Internet Protocol Network 100 are received. The method receives the first K (where K is an integer) packets at step 200. The receiver decrypts the first K packets at step 202 and searches for the pattern at step 203. If the specific pattern is detected at step 203, then the subsequent packets are decrypted and played out at step 400. If the specific pattern cannot be detected at step 203, the receiver considers no mode of encryption. Consequently, all such packets are discarded at step 300 until the appropriate in-band signalling message is received in the form of the specific pattern detection that serves to confirm the mode of operation of the transmitter.

In G.711, the chosen length of the silence string is 8 bytes, whereas for G.729 it is a full G.729 frame of 10 bytes. This makes the inventive method compatible with non-compliant receivers. The silence bytes, or frame for G.729, will have minimum impact on voice quality. In the G.729 case, the frame erasure feature may be invoked. For other CODEC types possessing the frame erasure capability, one would also choose a pattern that would invoke packet loss concealment (PLC) algorithms. Such PLC algorithms, also known as frame erasure concealment algorithms, hide transmission losses in an audio system where the input signal is encoded and packetized at a transmitter, sent over a network, and received at a receiver that decodes the packet and plays out the output.

Within the inventive method, the number of packets N that are modified at the start of the call is chosen to be two (N=2). While specifically two is chosen, it should be understood that any number of packets may be modified without straying from the intended scope of the present invention so long as more than one packet is modified to counter potential packet loss at the start of the call. The number of received packets to key on is chosen to be one (K=1) or some number of packets that is less than the N packets modified at the transmitter.

Figure 4:
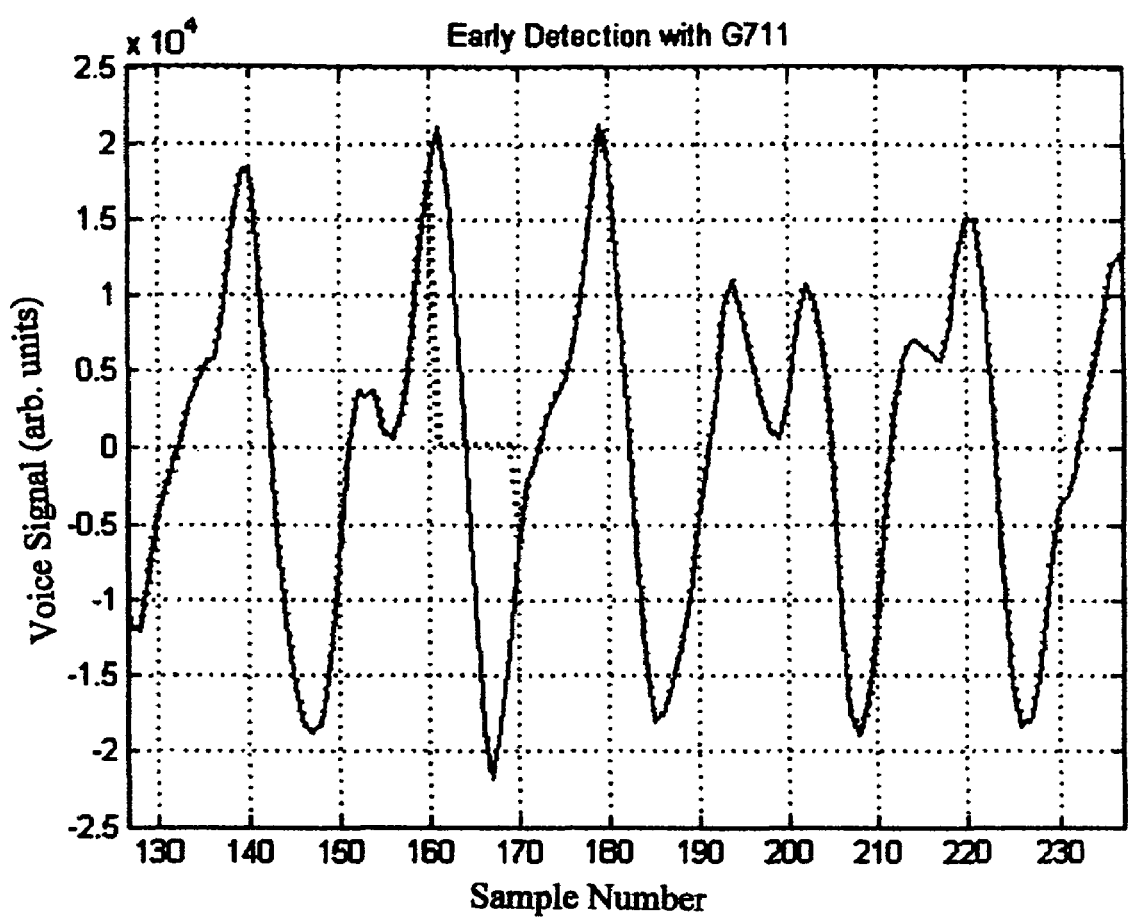
FIG. 4 is a graphical representation of a voice signal with G.711 showing the application of the method in accordance with the present invention.
Figure 5:
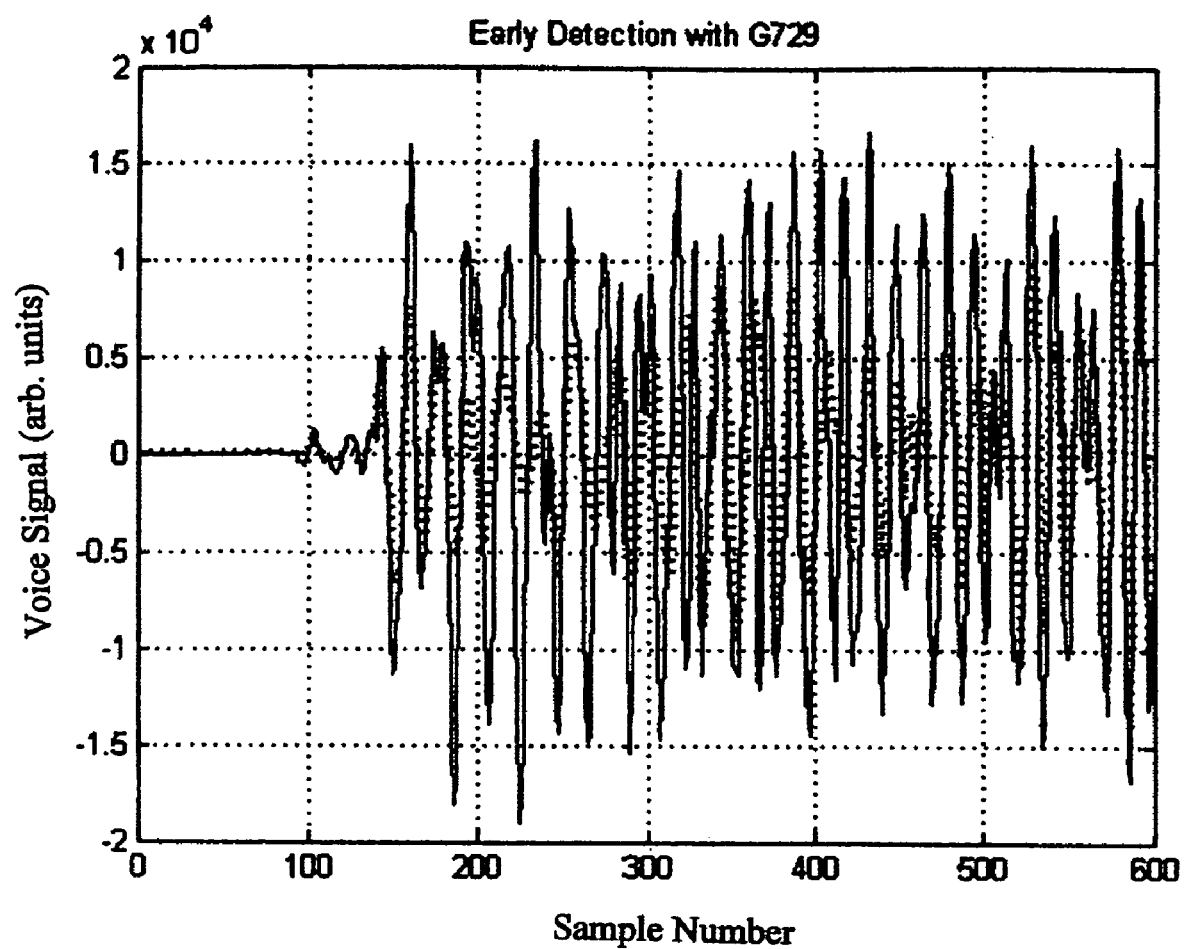
FIG. 5 is a graphical representation of a voice signal with G.729 showing the application of the method in accordance with the present invention.

FIGS. 4 and 5 graphically show the effect of the silence patterns on a voice signal. FIG. 4 shows the G.711 case. The dotted line is the signal with the early detection pattern (silence in this case). As can be seen between samples 160 and 170, 8 bytes of samples are overwritten with silence. FIG. 5 shows the G.729 case with the dotted line indicating the decoded G.729 signal with the early detection pattern. No distinctive area exists in the G.729 cases that shows signal error, though 400 samples were needed for complete rippling out of any error. As can be seen from both graphs, the impact on the signal is small. Subjective listening tests by the human ear have also confirmed that the impact on voice quality is minimal, such that the practical impact on a user and the perceived audio is negligible.

Instead of using a silence pattern, it should be readily apparent that other patterns may also be used without straying from the intended scope of the present invention. For example any pattern can be used for G.729, as long as the parity bit indicates frame erasure. The G.729 decoder will invoke the frame erasure feature and ignore all other data in the frame. Different lengths of pattern can be used (8 bytes for G.711 is suitable, though 4 bytes is sufficient). The number of modified frames with the pattern indication may be different from 2. Networks with high packet loss may require more packets.

Other capabilities may be sent in-band from the transmitter to the receiver. Such capabilities may include transmitter characteristics or any other useful information that may be embedded in the VoIP packets.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of providing in-band early encryption detection within a packet data network for telephony calls, the method comprising:
   prior to receiving a signalling message indicating a mode of operation of a transmitter end of said packet data network,
   receiving, at a receiver end of said packet data network, a plurality of voice stream packets;
   determining whether encryption capabilities of said receiver end and a transmitter end match, said determining comprising: determining whether at least one of said voice stream packets includes a predetermined pattern inserted into said packet at said transmitter end of said packet data network;

upon finding said predetermined pattern in said at least one of said voice stream packets, determining that said voice stream packets are unencrypted and changing a cipher to non-decryption mode prior to delivering said voice stream packets;

upon finding no said predetermined pattern in said at least one of said voice stream packets, decrypting said packet with a pre-configured cipher and further determining whether said decrypted packet includes said predetermined pattern;

upon finding said predetermined pattern in said decrypted packet, determining that said voice stream packets are encrypted and that the pre-configured cipher at the receiver end matches a cipher at the transmitter end, changing said cipher to decryption mode, and decrypting subsequent packets in said voice stream packets prior to delivering said decrypted voice stream packets; and upon finding no said predetermined pattern, discarding said decrypted packet and processing another one of said voice stream packets from said receiving step.

2. The method of claim 1 wherein said predetermined pattern is a silence pattern.

3. The method of claim 1 wherein said predetermined pattern is a series of zeros.

* * * * *